July 22, 1930. T. E. MURRAY, JR 1,771,187
VALVE CASING AND THE LIKE AND METHOD OF MAKING THE SAME
Filed Aug. 19, 1925
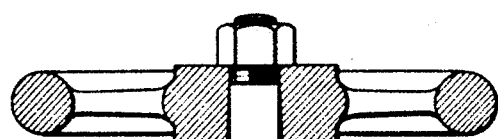
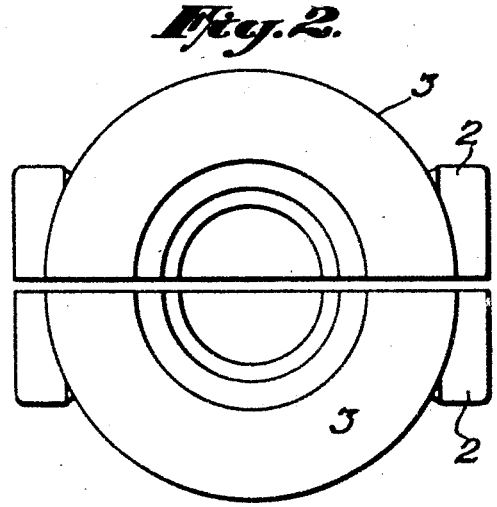
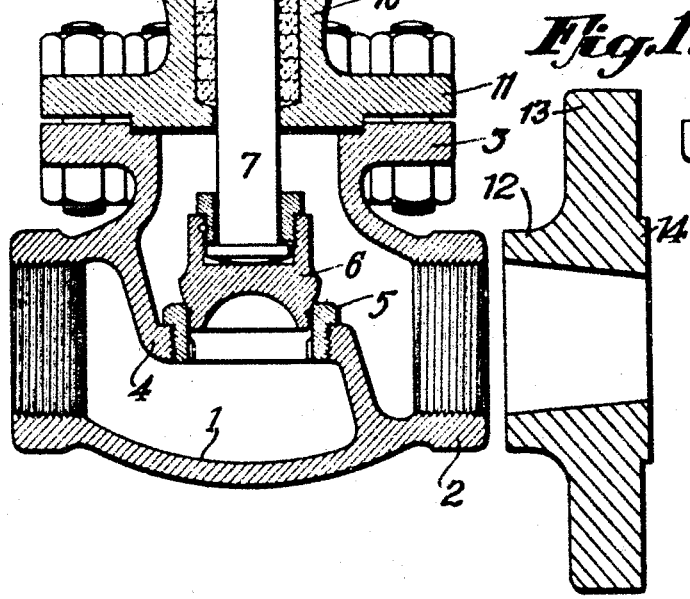
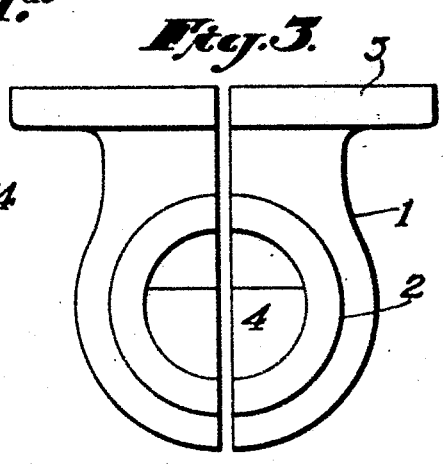
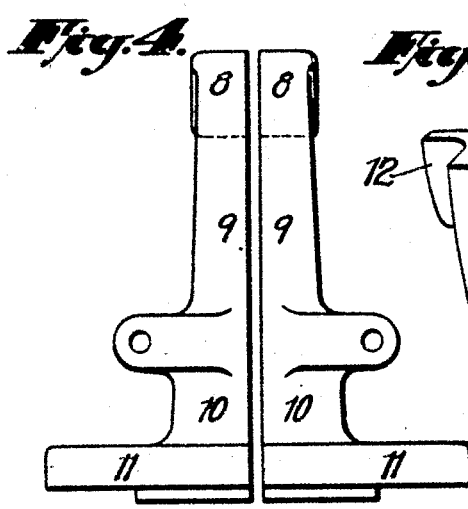
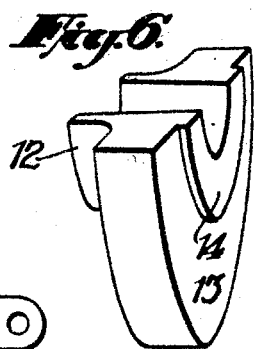
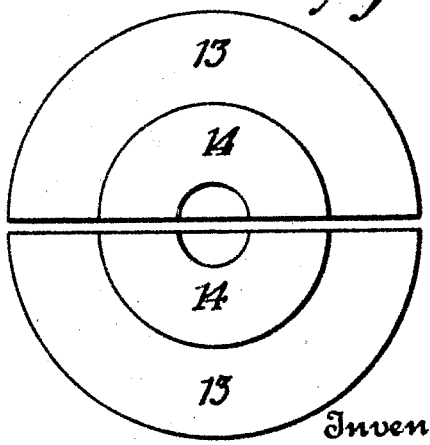
Inventor
THOMAS E. MURRAY JR.
By His Attorney Patented July 22, 1930

1,771,187

UNITED STATES PATENT OFFICE

THOMAS E. MURRAY, JR., OF BROOKLYN, NEW YORK, ASSIGNOR TO METROPOLITAN ENGINEERING COMPANY, A CORPORATION OF NEW YORK

VALVE CASING AND THE LIKE AND METHOD OF MAKING THE SAME

Application filed August 19, 1925. Serial No. 51,250.

My invention aims to provide improved valve casings and similar fittings adapted to withstand high pressures, and the method of making the same.

The accompanying drawings illustrate embodiments of the invention.

Fig. 1 is a longitudinal section of a high pressure globe valve.

Fig. 1ª is a partial section of a modification.

Figs. 2 and 3 are respectively a plan and an end elevation of the segments from which the body of the valve is made.

Fig. 4 is an elevation of the segments from which the bonnet is made.

Fig. 5 is an elevation of the segments from which a flange for the valve body is made.

Fig. 6 is a perspective of one of said flanges.

The valve body is made with a wall 1 having beads 2 on its ends threaded for connection to a pipe and with a wide flange 3 on its upper side for bolting to the bonnet. A diaphragm 4 carries a seat 5 for the valve 6 which is operated by a valve stem 7 threaded through the bonnet. The various parts of the casing and diaphragm are of different thicknesses. For example the wall 1 may be a quarter of an inch thick; the beads 2 three-eighths and the flange 3 half an inch; the thickness being graduated at the lines of junction of these parts.

The bonnet is a tubular structure with a comparatively small head 8 through which the valve stem is threaded, connecting members 9 spread apart to accommodate the packing gland, a narrow tubular neck 10 enclosing the packing and a flange 11 fitting and bolted to the flange 3 of the valve body. The walls of such a bonnet also vary considerably in thickness at different points; for example, from three-eighths to five-eighths of an inch.

Such globe valves are sometimes made with their ends flanged instead of screw threaded, to make a bolted connection to the piping. The shape of such a flanged end is shown in Fig. 1ª with a generally tapered, tubular portion 12, a wide and comparatively thick flange 13 and with a projecting central portion 14 on its outer face. Such flanged end pieces may be made in one with the body of the valve or they may be made separately as hereinafter described and welded to the ends of the valve body.

I propose to make the above articles and similar hollow articles of forged segments welded together. For example, as shown in Figs. 2 and 3 the body will be formed of two substantially semi-circular portions divided along a central longitudinal vertical plane. These segments are pressed out by drop forging or similar methods from a blank or billet generally heated and of uniform thickness and of sufficient volume to fill the hollow die, which is so shaped as to reduce the metal to the different thicknesses required at different points of the longitudinal section. A certain surplus of metal extruded from the dies is trimmed off to leave straight edges suitable for welding. For best results the forged metal should be low in phosphorus; otherwise it is apt to contain bands which give trouble in welding.

The segments are then welded together, preferably by the method of the Murray Reissue Patent No. 15,466, butting the longitudinal edges and pressing them together while passing a current of extremely high amperage for a very brief regulated period of time. Similarly the bonnet is forged first into two segments as shown in Fig. 4 and these are finished on their edges and butt welded as above described.

The heating of the blank or billet as described is important. The heating and drop forging effect a refinement in the original billet metal. During the welding operation the metal along the joint is further refined or improved in quality by the fact that it is heated above the critical temperature by the welding current and then subjected to pressure to weld the parts together.

Likewise the flanged end piece is made of two forgings as illustrated in Figs. 5 and 6, butt welded together by the same method. The body and the bonnet may be made in one piece of two segments forged and welded together, with or without flanged end pieces on the body. But the operation is simplified, without disadvantage, by making these parts separately. The range of thicknesses at the edges is less for any one of the parts than it is for two or more of them. And differences in thickness at edges to be joined in a single welding operation increase the difficulty of securing good welds, uniform along the length of the point. The same considerations apply in making other hollow articles of complicated shapes. They may be made in parts, each of segments welded to each other, and the parts afterwards welded or otherwise fastened to one another. While, for the valve illustrated, it is most convenient to make the parts of two substantially semi-circular segments, the invention may also be applied to the making of parts of more than two segments welded together.

The invention results in a valve body or other similar hollow article, the walls of which are of thicknesses calculated to withstand the strains which occur to a varying extent at different points, so as to be well adapted for high pressure use. Forged or drop forged metal is of the greatest strength and best adapted for such uses. By my invention valve casings and the like of the best quality and especially adapted for high pressure use can be made with comparatively simple and economical forging operations and at a total expense much less than that heretofore thought necessary. In oil stills where valves are used under high pressure and temperature they have to be renewed every sixty or ninety days. There are other uses where the requirements are very hard on the valves. Cast iron and cast steel are of little or no value in such situations. The chief method of meeting the conditions is to use solid forgings drilled out. Valves made in accordance with my invention have the strength of such forgings and are very much more economical. I have found by test that they will stand a pressure of 25,000 pounds to the square inch. I am aware that it has been proposed to make certain comparatively simple tubular products of pressed and forged segments welded together. But I believe it has never been proposed to make valve casings or similar fittings having tubular parts at an angle with each other by such a method. Such casings have generally been made for high pressure work of solid forgings drilled out. A diaphragm like that shown, the edge of which joins an inner surface of the wall, adds to the complications and makes the hot forging of the segments a matter of importance in the securing of sound, strong metal along the joint of the diaphragm to the wall.

The welding of two segments together may be completed in a single operation by the method above described. The longitudinal edges of the forged segments being shaped to fit each other throughout their length, the operation is practically instantaneous, using an extremely high current density or amperage per unit of area of the joints.

While the invention is of particular importance in the making of forged hollow or tubular articles whose walls are of varying thickness, yet there are forgings with walls of substantially or approximately uniform thickness, such as some valve casings and similar articles which require to be of great strength but are of such shape as not to permit the forging of them in ordinary ways. My invention may be used with advantage also in making hollow forged articles of this sort. The operations are more advantageously performed where the article can be divided into segments which are symmetrical with each other, as by the longitudinal vertical plane of division of the valve casing described.

Various modifications of the method and article described may be made by those skilled in the art without departure from the invention as defined in the following claims.

What I claim is:

1. In the making of high pressure valves the method which consists in making the valve body of drop forged segments with walls of varying thickness and butt-welding said segments together, making the bonnet of forged segments with walls of varying thickness and butt-welding said segments together, and uniting said bonnet and valve.

2. The method of making valve casings and the like having extended tubular portions at an angle with one another and having walls of varying thickness which consists in hot forging segments of such a casing from a blank with longitudinal edges of the required varying thickness and butt welding the edges of said segments together.

3. The method of making valve casings and the like having extended tubular portions at an angle with one another and having walls of varying thickness which consists in heating billets and forging them into segments of such a casing with longitudinal edges of required varying thickness and electrically butt-welding such segments together.

4. The method of making valve casings and the like having extended tubular portions at an angle with one another and having an internal diaphragm connected to the wall of the casing which consists in hot forging segments of such a casing from a blank, with corresponding integral segments of the diaphragm and with longitudinal edges of such varying thickness and electrically butt welding the edges of said segments together.

5. A valve casing or the like having walls of varying thickness and an internal diaphragm and composed of segments drop forged and butt welded together, the segments including diaphragm-portions integral with the wall-portions.

6. A high pressure valve casing having a diaphragm and extended tubular portions at an angle with one another and having walls of varying thickness, said casing consisting of symmetrical segments having their edges in the plane of the centers of said tubular portions, each segment including a portion of the diaphragm such segments being welded together.

In witness whereof, I have hereunto signed my name.

THOMAS E. MURRAY, Jr.